United States Patent

Usagawa

[15] 3,652,792

[45] Mar. 28, 1972

[54] AUTOMATIC SENSITIVITY CONTROL CIRCUIT FOR IMAGE PICKUP CAMERA

[72] Inventor: Koji Usagawa, Tokyo, Japan

[73] Assignee: Victor Company of Japan, Limited, Yokohama-City, Japan

[22] Filed: Sept. 3, 1969

[21] Appl. No.: 854,850

[30] Foreign Application Priority Data

Sept. 4, 1968 Japan....................................43/63064

[52] U.S. Cl.......................................178/7.2 R, 178/DIG. 29

[51] Int. Cl...........................................................H04n 5/14

[58] Field of Search..................................178/7.1, 7.2, 7.2 E

[56] References Cited

UNITED STATES PATENTS 2,310,285 2/1943 Hanson ...............................178/7.2 E 2,407,485 9/1946 Essig ...................................178/7.2 E 2,901,534 8/1959 Morgan...............................178/7.2 E 3,465,094 9/1969 Biernson et al......................178/7.2 E

*Primary Examiner*—Robert L. Griffin

*Assistant Examiner*—Richard P. Lange

*Attorney*—Holman and Stern

[57] ABSTRACT

An automatic sensitivity control circuit for image pickup camera having an amplifier provided in a control roop for controlling an output signal of a vidicon, said amplifier having a photoconductive element varying its resistance value in response to the scene illumination. By the variation of the gain of said amplifier in response to the variation of resistance value of said element, the output signal of said vidicon is controlled to small when the illumination is low and large when the illumination is high.

13 Claims, 8 Drawing Figures

INVENTOR.
Koji Usagawa
BY Holman, Glascock, Downing & Seebold
ATTORNEYS

INVENTOR
Koji Usagawa

BY Holman, Glascock, Downing & Seebold
ATTORNEYS

INVENTOR.
Koji Usagawa
BY Holman, Glascock, Downing & Seebold
ATTORNEYS

AUTOMATIC SENSITIVITY CONTROL CIRCUIT FOR IMAGE PICKUP CAMERA

The present invention relates to an automatic sensitivity control circuit for an image pickup camera and more particularly to a circuit for automatically controlling the sensitivity of an image pickup camera using a vidicon and the like for obtaining a constant camera output and a good picture quality regardless of the illumination of objects or scene illumination.

The automatic sensitivity control circuit in the vidicon camera has conventionally comprised a circuit means for taking out a part of an output of a video amplifier for amplifying an output signal current of a vidicon, amplifying and rectifying it, and a means for controlling the target electrode voltage of the vidicon to low in response to the signal from a current rectifying circuit when the scene illumination is large and inversely controlling said electrode voltage to high when the scene illumination is small so that the output signal current of the vidicon may be kept approximately constant and thereby the sensitivity is controlled. In such a conventional circuit the output current of the vidicon was controlled always constant whether the illumination is large or small, whereby when the scent illumination was low as for example, a dark current component was increased in the output current of the vidicon and a pure signal component was relatively decreased, and consequently the contrast of image was worsened. In known vidicon camera having the above conventional circuit it was impossible to set the lower limit of the illumination to pick up an image in practice and the range of illumination for possible automatic control of sensitivity (hereafter called the automatic control range) was relatively narrow. In this conventional circuit, if the gain of the video amplifier is made large such that the output current taken from the vidicon may sufficiently be small, thereby is obtained a current of a predetermined level as an output current of a camera even if the scene illumination is small. Thus the minimum illumination for the image pickup can be made small and accordingly the automatic sensitivity control range can be enlarged. However this has disadvantages that the S/N ratio deteriorates due to noise at the primary stage of the video amplifiers and the residual image increases as the output signal current of the vidicon becomes small. Therefore it is not desirable to set the gain of the video amplifier always large and the output current of the vidicon always small.

The present invention has for its object to overcome the disadvantages of the conventional circuit as described, by providing a particular construction of circuit which can vary the gain of the video amplifier in response to the scene illumination.

The principal object of the present invention is to provide an automatic sensitivity control circuit which is capable of making an automatic sensitivity control of an image pickup camera when the scene illumination is considerably low and which has a very large sensitivity control range.

Another object of the present invention is to provide an automatic sensitivity control circuit which can effect a good picture quality even when the scene illumination to be picked up an image by the image pickup camera is large and also a good contrast even when said illumination is small.

Further object of the present invention is to provide an automatic sensitivity control circuit using an amplifier which has a photoconductive element or a photosensitive resistance element being variable in resistance by amounts of incoming light and in which the gain varies according to the scene illumination.

Still another object of the present invention is to provide an automatic sensitivity control circuit which is adapted to vary simultaneously the gain of the video amplifier and the output current of the vidicon in response to the scene illumination and to control the output signal current of the image pickup camera always constant.

Other objects and features of the present invention will be apparent from the following description of the specification and the accompanying drawings, in which.

Figure 1:
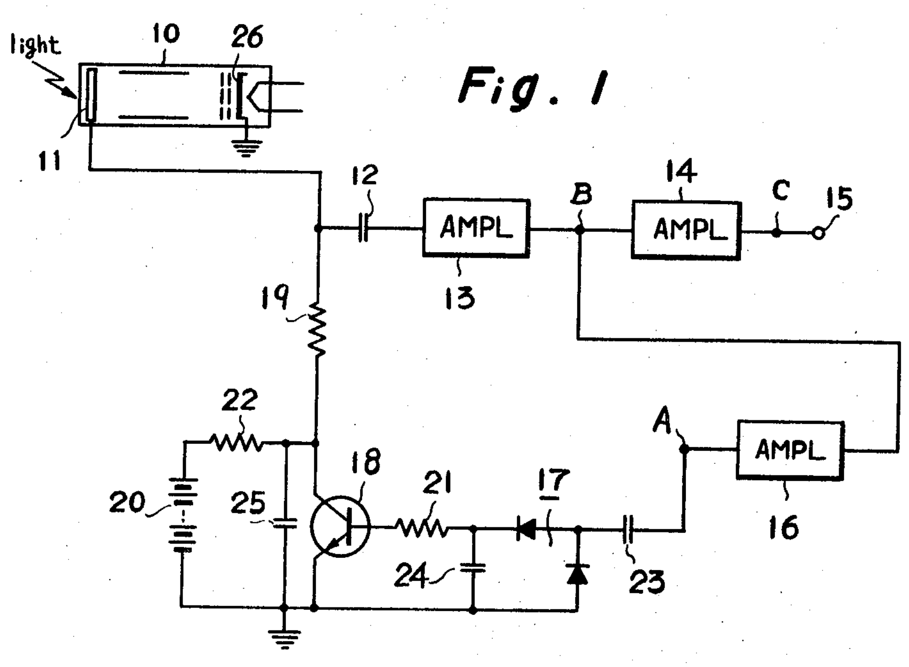
FIG. 1 is a circuit diagram of an embodiment according to the present invention.

Now, FIG. 1 shows a circuit diagram of the vidicon camera as an image pickup camera in use of an embodiment of the circuitry according to the present invention. In the figure, the output signal current taken from a target electrode 11 of a vidicon 10 is supplied through a capacitor 12 to a video amplifier 13 later described with reference to FIG. 2. The output of the amplifier 13 is on one hand amplified by an amplifier 14 and thereafter taken from an output terminal 15 as an output signal of the vidicon camera and transmitted to a monitor receiver (not shown). On the other hand the output of the amplifier 13 is branched off at a point B and fed to an amplifier 16. The output of the amplifier 16 is rectified through a rectifying circuit 17 having a diode and thereafter applied on the base of a control transistor 18. The emitter of the transistor 18 is earthed to the ground and its collector is connected to the target electrode 11 of the vidicon 10 through a resistor 19. A power source 20 is connected between the collector and the emitter of the transistor 18. The voltage of the target electrode 11 of the vidicon 10 is controlled by the collector voltage of the transistor 18.

Herein, in case a silicone transistor is used for the transistor 18, the base voltage of the transistor may be assumed to be constant for example at approximately 0.7 v. irrespective of the value of a voltage and a current of a collector when the transistor is not provided in a cutoff state. Therefore, the signal voltage at a point A on the output side of the amplifier 16 may be almost constant. Assuming that the gain of said amplifiers 13 and 16 in the vidicon target voltage control loop system including the target electrode 11, the amplifiers 13 and 16, the rectifying circuit 17, and the transistor 18 be constant it is possible to make the output signal current of the vidicon almost constant. Therefore, if the gains of the amplifiers 13 and 14 amplifying the signals from the vidicon 10 to the terminal 15 are respectively constant, the output current of the camera taken from the terminal 15 may be constant, whereby the known automatic sensitivity control is performed.

Figure 4:
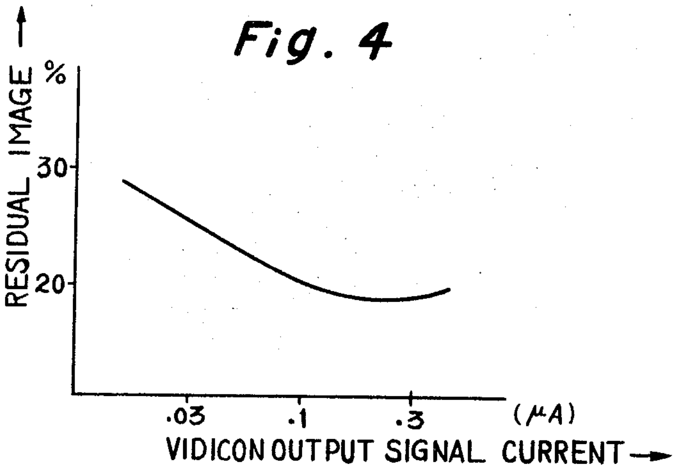
FIG. 4 is a graph showing a characteristic curve of a residual image relative to the vidicon output current.

However it was found that if the gain of the amplifier 13 is made constant and the output current of the vidicon 10 also constant, the dark current was increased and worsened the image contrast when the illumination of objects or the scene illumination is small and if the gain of the amplifier 13 is made large and the output current of the vidicon 10 small, there was increased the residual image so much as the output signal current of the vidicon is made small as shown in FIG. 4 and this caused disadvantages.

Since the signal voltage at the point A is constant as described, the signal voltages at points A, B, and C will not vary even though the gain of the amplifier 13 would vary if the gain of the amplifiers 14 and 16 are assumed constant, so that the output signal current of the vidicon 10 would vary relative to the change of the gain of the amplifier 13. When it is provided that the gain of the amplifier 13 is large as the scene illumination is small and inversely that the gain of the amplifier 13 is small when the scene illumination is large, the output current of the vidicon 10 may vary while the output signal at the point C or from the terminal 15 is constant at a definite value.

Figure 2:
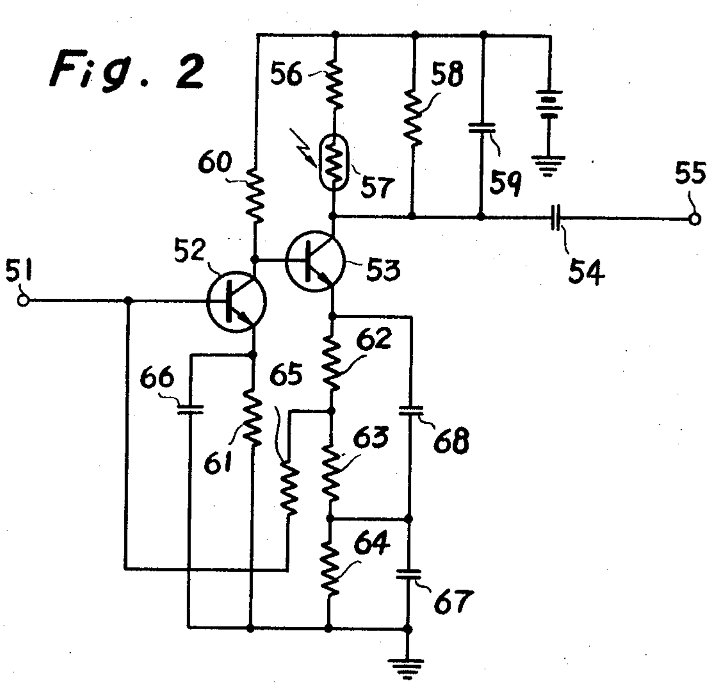
FIG. 2 is an electric circuit showing an actual circuitry of an amplifier as an essential portion of the diagram of FIG. 1.

According to the present invention the amplifier 13 has a circuit construction as shown in FIG. 2, which is so designed that the gain of the amplifier 13 can be varied in response to the scene illumination and thereby the disadvantages such as above described will be eliminated.

In FIG. 2, the output signal current of the target electrode 11 of the vidicon 10 being supplied from a terminal 51 is supplied to a base of a transistor 52. Thus, the collector output of the transistor 52 is supplied to a base of a transistor 53, and in turn the collector output of said transistor 53 is taken from a terminal 55 through a capacitor 54. To the collector of the transistor 53 is connected to a parallel connection of a resistor 58 and a serial circuit of a resistor 56 and a cadmium sulfide (CdS) element 57. In substitute for the cadmium sulfide element 57 there may be provided other photoconductive or photosensitive resistance element such as a thallium sulfide (TlS) or a lead sulfide (PbS) element.

Figure 3:
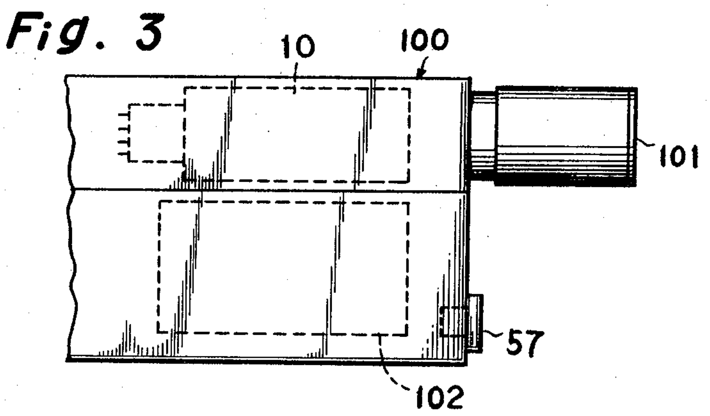
FIG. 3 is a diagrammatic side view of an image pickup camera using the circuit according to the invention.
Figure 5:
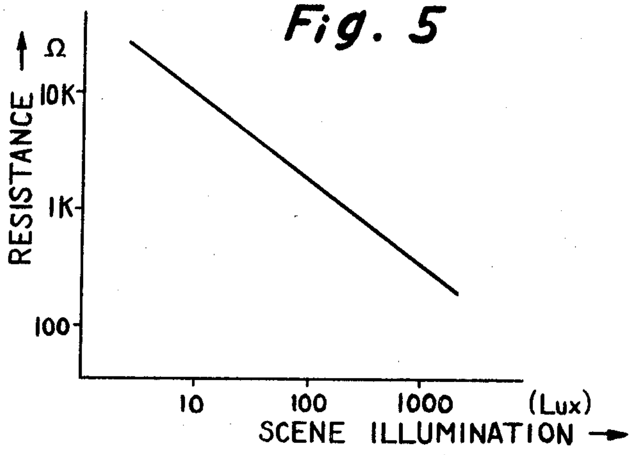
FIG. 5 is a graph of a characteristic curve showing the variation of resistance values of a cadmium sulfide.

FIG. 3 shows a diagrammatic side view of an image pickup camera 100 having a vidicon 10 in the rearward portion of lenses 101 and a circuit 102 including the video amplifier 13 in the lower portion. The above cadmium sulfide element 57 is provided at a position in front of the camera 100 capable of detecting the illumination of the scene or objects that the vidicon picks up its image through the lenses 101. Resistance value Rx of the cadmium sulfide element 57 varies in negative gradient in response to the variation of the scene illumination as shown in FIG. 5, thus the larger being the scene illumination the smaller is the resistance value Rx and inversely the smaller being the scene illumination the larger is the resistance value Rx. Therefore, the amplifier 13 including the transistor 53 having cadmium sulfide element 57 connected to its collector is varied in the gain by the variation of resistance value of the element 57 in response to the variation of the scene illumination, wherein the gain becomes small so much as the scene illumination is large and inversely the gain becomes large and so much as the illumination is small as shown by the curved line in FIG. 6. The ordinate axis in FIG. 6 indicates the relative gain when it is given as 1 when the scene illumination is sufficiently large. As the variation of voltage gain of the transistor 53 is represented by the variation in the ratio of the collector resistance and the emitter resistance, the variation of gain of the amplifier 13 will be given by the formula:

$$\frac{(R_2+R_x)R_1}{R_2+R_x+R_1}$$

where the resistance of the resistor 56 is represented by $R_2$ and the resistance of the resistor 58 by $R_1$. The curve in FIG. 6 may be obtained from the variation indicated in FIG. 5 and the above mentioned formula. It will be apparent from FIG. 6 that when the scene illumination is larger than approximately 300 lux, for example, the relative gain of the amplifier 13 is approximately 1 and when the scene illumination becomes approximately 10 lux the relative gain of the amplifier 13 is approximately 3, i.e., an increase of around three times the gain in the amplifier when said illumination is more than 300 lux.

As hereinbefore described, the voltage between the base and the emitter of the transistor 18 is constant and also the voltage at the point A is constant, and when the scene illumination becomes small and the gain of the amplifier 13 large and the base-emitter voltage of the transistor 18 becomes large even slightly, the collector current becomes large and the collector voltage becomes small. Consequently the voltage of the target 11 turns small so that the output signal current of the target 11 becomes small resulting in that the dark current of the vidicon 10 becomes small and there will be obtained an output video signal of good picture quality and a good image contrast. Inversely when the scene illumination is large and the gain of the amplifier 13 becomes small, the target voltage in accordance with the collector output of the transistor 18 becomes large and therefore the output signal current of the target is large and it is possible to obtain an output video signal excellent in the S/N ratio and the residual image characteristics.

Figures 6, 7, 8:
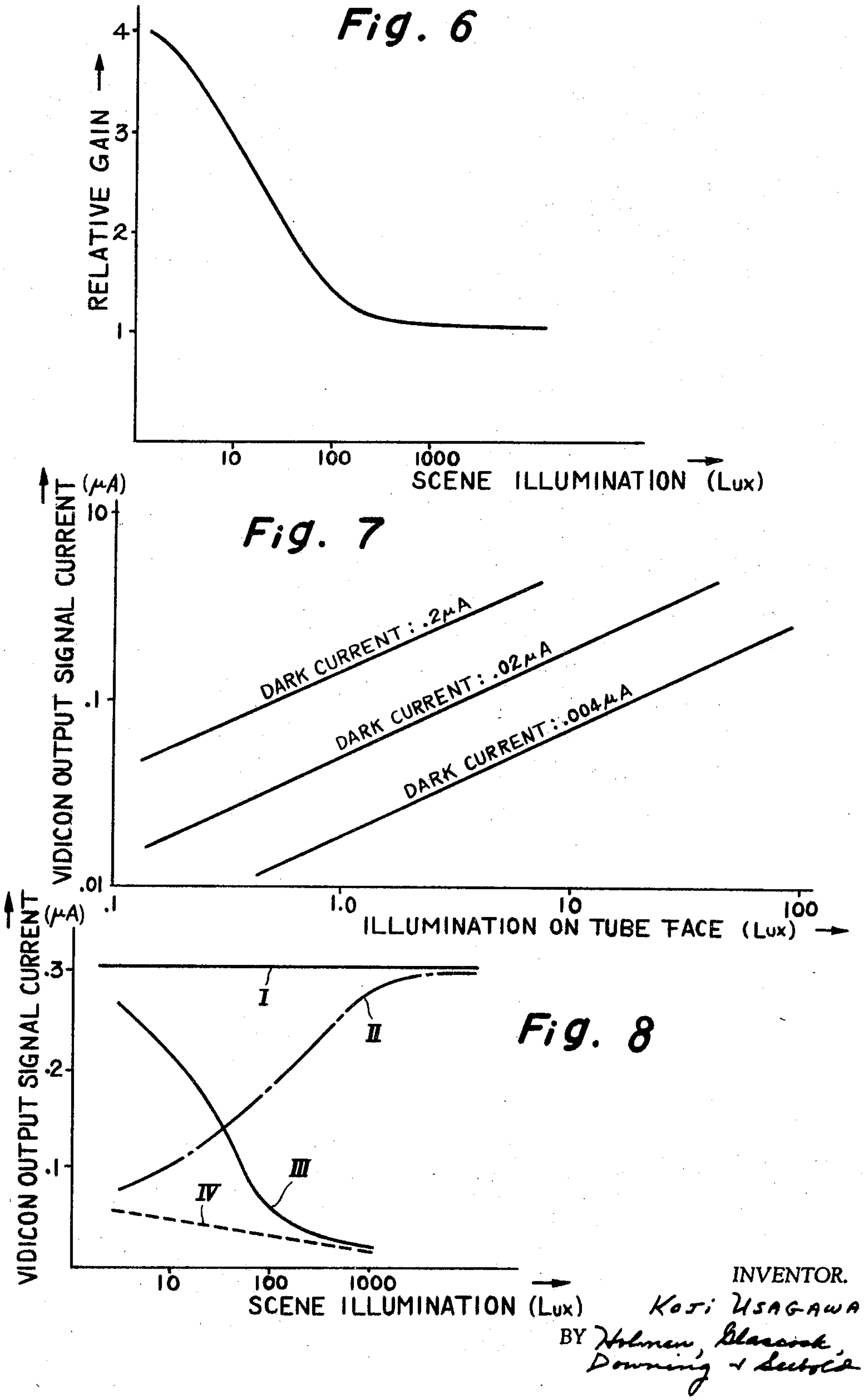
FIG. 6 is a graph of a characteristic curve showing the variation of relative gains of the amplifier shown in FIG. 2 to the scene illumination.
FIG. 7 is a characteristic graph showing the variation of the output signal current of the vidicon relative to the scene illumination and FIG. 8 is a graph of characteristic curves showing respectively variations of the output currents and the dark currents relative to the scene illumination respectively provided in the circuit of the present invention and the conventional one.

More detailedly, when a vidicon tube is used as having characteristics of the output signal current relative to the illumination on the tube face as shown in FIG. 7, the characteristics of the output current and the dark current are obtained as shown in FIG. 8. In this FIG., the vidicon output signal current of the conventional circuit is shown by a rectilinear full line I which designates that the current is constant approximately at 0.3 zA regardless of the value of the illumination. The dark current is shown by a curved full line III indicating that the dark current is small in the high illumination but rapidly increased in the low illumination. According to the conventional circuit therefore the pure signal component is relatively small in the low illumination and the contrast is extremely deteriorated. On the contrary in the circuit of the present invention the vidicon output signal current is, as shown by a curved chain line II, small in the low illumination and large in the high illumination. Therefore the dark current included in this signal is, as shown by a curved broken line (approximately rectilinear) IV, slightly increased in the low illumination but extremely small in the value as a whole and the vidicon output signal has an excellent contrast. In the same figure, should the automatic sensitivity control range be defined in term as a range in which the dark current is less than one half the vidicon output signal current, the lower limit of the control range is approximately 30 lux for the conventional circuit and approximately 10 lux for the circuit of the present invention. It will be seen that the control range ratio of the circuit according to the present invention may be enlarged around three times the control range of the conventional circuit.

Further in the circuit shown in FIG. 2, a capacitor 59 is connected in parallel to the resistor 58 in the collector circuit of the transistor 53 so that when the illumination becomes small and the gain of the amplifier 13 rises with the vidicon output current becoming small, the impedance of the capacitor 59 is not negligible for the components of the high frequency range, in consequence the rise of gain for the components of the high frequency range is comparatively limited so that the deterioration of S/N ratio of components of the high frequency range is markedly small. A capacitor 67 is connected to the emitter circuit of the transistor 53 and constitutes an emitter high peaker circuit producing a peak in the high frequency range of the frequency characteristics.

Circuit elements as shown in FIGS. 1 and 2, such as resistances and capacitances respectively for resistors 19, 21, 22, 56, 58, 60—65, and capacitors 12, 23—25, 54, 59, 66—68 are as follows:

| | | | |
|---|---|---|---|
| Resistor | 19 | Resistance | 22MΩ |
| | 21 | | 2.2KΩ |
| | 22 | | 22KΩ |
| | 56 | | 1.5KΩ |
| | 58 | | 4.7KΩ |
| | 60 | | 68KΩ |
| | 61 | | 4.7KΩ |
| | 62 | | 1.5KΩ |
| | 63 | | 3.9KΩ |
| | 64 | | 470Ω |
| | 65 | | 150KΩ |
| Capacitor | 12 | Capacitance | 0.0047μF |
| | 23 | | 2.2μF |
| | 24 | | 2.2μF |
| | 25 | | 10μF |
| | 54 | | 10μF |
| | 59 | | 10PF |
| | 66 | | 100μF |
| | 67 | | 47PF |
| | 68 | | 100μF |

In the embodiments as described, the voltage of the target electrode 11 of the vidicon 10 is controlled by the variation of the collector voltage of the transistor 18 but it may be permitted that the voltage of the cathode 26 of the vidicon 10 may be controlled by the variation of the collector voltage of the transistor 18 provided that the voltage between the target electrode 11 and the cathode electrode 26 of the vidicon 10 will be controlled by said collector voltage.

While the invention has been described with respect to the specific and preferable embodiment, various modifications and variations thereof will be apparent to those skilled in the art without departing from the scope of which is set forth in the appended claims.

I claim:

1. An automatic sensitivity control circuit for image pickup camera having a loop circuit which comprises a vidicon for picking up a scene, an amplifier for amplifying an output signal of said vidicon, a photosensitive resistance element in a load circuit of said amplifier defining a first control means for controlling the gain of said amplifier by varying its resistance value in response to the illumination intensity of the scene picked up by said vidicon, said resistance value varying in reverse relation to the illumination intensity so that the gain of said amplifier increases so much as the illumination intensity is low and decreases so much as the illumination intensity is high; and a control circuit defining a second control means for controlling the output signal current of said vidicon to be supplied to said amplifier in response to the output signal from said load circuit of said amplifier, so as to control the output signal level of said amplifier to be constant.

2. The automatic sensitivity control circuit according to claim 1, wherein said photosensitive resistance element is disposed in a forward position of said image pickup camera to detect the illumination intensity of the scene.

3. The automatic sensitivity control circuit according to claim 2, wherein said photosensitive resistance element is a cadmium sulfide element.

4. An automatic sensitivity control circuit for image pickup camera having a loop circuit which comprises a vidicon for picking up a scene; an amplifier for amplifying the output signal current of said vidicon, said amplifier having a load circuit including at least a photosensitive resistance element which varies its resistance value in response to the illumination intensity of the scene picked up by said vidicon, said resistance value varying in reverse relation to the illumination intensity so that the gain of said amplifier increases so much as the illumination intensity is low and decreases so much as the illumination intensity is high; and control means responsive to the level of the output signal from said load circuit of said amplifier for controlling the output signal current of said vidicon so as to control the variation of the gain of said amplifier, said control means comprising a current rectifying circuit for rectifying the output signal of said amplifier and a control transistor circuit supplied the output signal of said current rectifying circuit to its base and controlling said vidicon to vary the output signal current of said vidicon by its collector voltage.

5. The automatic sensitivity control circuit according to claim 4, wherein said transistor circuit has an arrangement in which the voltage of the base circuit is substantially constant and the collector voltage varies in response to the variation of the gain of said amplifier.

6. The automatic sensitivity control circuit according to claim 4, wherein the collector of said transistor is connected to said vidicon such that said collector voltage controls the voltage between a target electrode and a cathode electrode of said vidicon.

7. The automatic sensitivity control circuit according to claim 5, wherein said transistor circuit has a silicon transistor, and the base-emitter voltage of said transistor is substantially constant so that the level of the output signal of said amplifier is controlled to be constant, and wherein said collector voltage controls the output signal current of said vidicon in response to the variation of the gain of said amplifier so that the level of the output signal of said amplifier may be constant.

8. The automatic sensitivity control circuit according to claim 6, wherein the collector of said transistor is connected to the target electrode of said vidicon.

9. An automatic sensitivity control circuit for image pickup camera which comprises an amplifier supplied an output signal current of a vidicon and amplifying said current; a loop circuit supplied an output of said amplifier and controlling the output signal current of said vidicon so that the output of said amplifier may be constant; and means for taking out the camera output from said amplifier output, said amplifier having a photoconductive or a photosensitive resistance element varying its resistance value in response to the scene illumination to be picked up an image by said vidicon whereby the gain of the amplifier is varied in response to the variation of resistance value of said element, and said loop circuit comprising a current rectifying circuit for rectifying the output of said amplifier and a control transistor circuit supplied the output of said current rectifying circuit to the base and controlling said vidicon to vary the output signal current of said vidicon by the collector voltage in inverse proportion to the variation of the gain of said amplifier.

10. The automatic sensitivity control circuit for image pickup camera according to claim 9, wherein said transistor circuit has an arrangement in which the voltage of the base circuit is always constant and the collector voltage varies in response to the variation of the gain of said amplifier.

11. The automatic sensitivity control circuit for image pickup camera according to claim 9, wherein the collector of said transistor is connected to said vidicon such that said collector voltage controls the voltage between a target electrode and a cathode electrode of said vidicon.

12. An automatic sensitivity control circuit for image pickup camera according to claim 10 wherein said transistor circuit has a silicone transistor, and the base-emitter voltage of said transistor is always constant so that the output of said amplifier is controlled to constant and wherein said collector voltage controls the output current of said vidicon in response to the variation of the gain of said amplifier so that the output of said amplifier may be constant.

13. An automatic sensitivity control circuit for image pickup camera according to claim 11, wherein the collector of said transistor is connected to a target electrode of said vidicon.

* * * * *